(12) United States Patent
Nambu

(10) Patent No.: US 7,224,834 B2
(45) Date of Patent: May 29, 2007

(54) COMPUTER SYSTEM FOR RELIEVING FATIGUE

(75) Inventor: Masaya Nambu, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 09/789,523

(22) Filed: Feb. 22, 2001

(65) Prior Publication Data
US 2002/0015527 A1 Feb. 7, 2002

(30) Foreign Application Priority Data
Jul. 26, 2000 (JP) .............................. 2000-225181

(51) Int. Cl.
G06K 9/00 (2006.01)
(52) U.S. Cl. ...................... 382/181; 382/117; 382/209; 348/99; 348/108; 348/125
(58) Field of Classification Search ................ 382/115, 382/117, 118, 209, 217, 218, 219, 278, 190, 382/282; 701/9, 45; 340/575, 576, 5.52, 340/5.53; 348/77, 207.1, 99, 100, 108, 125; 902/3, 5
See application file for complete search history.

(56) References Cited

U.S. PATENT DOCUMENTS

| | | | | |
|---|---|---|---|---|
| 4,703,347 A * | 10/1987 | Yasuda et al. | ............... | 348/150 |
| 5,644,642 A * | 7/1997 | Kirschbaum | ............... | 382/103 |
| 5,715,325 A * | 2/1998 | Bang et al. | ................. | 382/118 |
| 5,729,619 A * | 3/1998 | Puma | ......................... | 382/115 |
| 5,832,189 A * | 11/1998 | Tow | ............................ | 700/259 |
| 5,867,587 A * | 2/1999 | Aboutalib et al. | .......... | 382/117 |
| 6,049,747 A * | 4/2000 | Nakajima et al. | ............. | 701/45 |
| 6,087,941 A * | 7/2000 | Ferraz | ........................ | 340/575 |
| 6,154,559 A * | 11/2000 | Beardsley | .................. | 382/103 |
| 6,175,772 B1 * | 1/2001 | Kamiya et al. | ............... | 700/31 |
| 6,243,076 B1 * | 6/2001 | Hatfield | ...................... | 345/156 |
| 6,323,761 B1 * | 11/2001 | Son | ........................ | 340/426.35 |
| 6,335,977 B1 * | 1/2002 | Kage | .......................... | 382/107 |
| 6,400,835 B1 * | 6/2002 | Lemelson et al. | .......... | 382/118 |
| 6,401,050 B1 * | 6/2002 | Cooke et al. | ............... | 702/127 |
| 6,585,521 B1 * | 7/2003 | Obrador | ..................... | 434/236 |
| 6,611,613 B1 * | 8/2003 | Kang et al. | ................. | 382/118 |
| 6,707,484 B1 * | 3/2004 | Kawasaki et al. | ........ | 348/14.01 |
| 6,747,652 B2 * | 6/2004 | Inoue et al. | ................ | 345/474 |

(Continued)

FOREIGN PATENT DOCUMENTS

JP    1-163874    6/1989

(Continued)

OTHER PUBLICATIONS

Office Action dated May 16, 2006 from JPO.

*Primary Examiner*—Jingge Wu
*Assistant Examiner*—Yosef Kassa
(74) *Attorney, Agent, or Firm*—Staas & Halsey LLP

(57) ABSTRACT

A computer system for relieving an operator's fatigue includes an input device, an image processing circuit, a fatigue determination circuit, and an information generator circuit. The computer system also includes an output device, a response information storage device, and a fatigue degree criteria storage device. The operator's face is captured to create a model image of the face, which is analyzed to determine the fatigue degree of the operator. The response information corresponding to the fatigue degree is output to notify the operator.

28 Claims, 7 Drawing Sheets

U.S. PATENT DOCUMENTS 6,748,421 B1 * 6/2004 Ozkan et al. ............... 709/206
6,771,303 B2 * 8/2004 Zhang et al. ............ 348/14.16
6,879,709 B2 * 4/2005 Tian et al. .................. 382/118

FOREIGN PATENT DOCUMENTS

| JP | 4-120668 | 4/1992 |
| JP | 8-44861 | 2/1996 |
| JP | 9-22314 | 1/1997 |
| JP | 9-28679 | 2/1997 |
| JP | 9-267660 | 10/1997 |
| JP | 10-960 | 1/1998 |
| JP | 10-153946 | 6/1998 |
| JP | 11-203006 | 7/1999 |

* cited by examiner

Fig.2

Fatigue Degree Criteria Table ~240

| Position Information | 3D size Information | Color Information | Degree of Fatigue |
|---|---|---|---|
| Dark Ring Around Eye | ≤$xcm^3$ | Gray | 1 |
| Dark Ring Around Eye | ≤$ycm^3$ | Black | 2 |
| ⋮ | ⋮ | ⋮ | ⋮ |

Response Information Table ~250

| Degree of Fatigue | Output Device | Contents |
|---|---|---|
| 1 | Display | Message Prompting to have a break |
| 2 | Speaker | Music liked by Operator |
| ⋮ | ⋮ | ⋮ |

25a     25b     25c

COMPUTER SYSTEM FOR RELIEVING FATIGUE

FIELD OF THE INVENTION

The present invention relates to a computer system, and more particularly, to a computer system for relieving fatigue of an operator.

BACKGROUND OF THE INVENTION

Nowadays, with the widespread Internet use and office automation, computer operators are required to work for a longer time and therefore suffer from more fatigue. It is important, therefore, to relieve their fatigue.

Preferably, the operators should have a periodic break (for example, once an hour) to take exercise for recovering from their fatigue of eyes, neck, hands and back. If the operator is absorbed in operating a computer apparatus, he or she may forget to have a break or take exercise. To solve this problem, Japanese Unexamined Patent Publications Nos. Hei 1-163874 and Hei 4-120668 disclose break notification systems that display a break sign on the screen of the display every predetermined time. The break sign allows the operator to recognize that it is time to have a break or take exercise.

The break notification systems, however, display a break sign based on the operating time of a computer apparatus rather than the fatigue degree of the operator. Since the operating time of a computer apparatus is counted even when the operator is away from the computer apparatus, the break sign may be displayed even though the operator is not tired. The break sign displayed in such a situation is annoying to the operator. In addition, the break notification systems do not have the ability to relieve the operator's fatigue.

SUMMARY OF THE INVENTION

It is an object of the present invention to provide a computer system for relieving fatigue of an operator.

According to a first aspect of the present invention, a computer system for relieving an operator's fatigue includes an input device for capturing an image of the operator's face to generate image data representing the face and an image processing circuit connected to the input device for creating a model image of the operator's face from the image data. The system also includes a fatigue determination circuit connected to the image processing circuit for analyzing the model image to determine a fatigue degree of the operator and an information generator circuit connected to the fatigue determination circuit for generating response information in accordance with a result of the determination.

The image processing circuit creates the model image every predetermined time. The fatigue determination circuit compares the currently created model image with the previously created model image to determine the fatigue degree based on the difference between the two model images. The computer system further includes an output device connected to the information generator circuit for outputting the response information such that the response information can be delivered to the operator.

The computer system further includes a response information storage device connected to the information generator circuit for storing a response information table representing a correspondence among the degree of fatigue, the response information, and the output device to which the response information is output. The information generator circuit supplies the response information to the output device with reference to the response information table. The response information storage device can store a plurality of response information tables in accordance with a plurality of operators.

The computer further includes a fatigue degree criteria storage device connected to the fatigue determination circuit for storing a fatigue determination criterion set in accordance with the fatigue degree of the operator. The fatigue determination criterion includes information on a size of the fatigue appearance region, and information on a state of the fatigue appearance region. The fatigue determination circuit determines the degree of fatigue with reference to the result of an analysis of the model image and the fatigue determination criterion including information on a fatigue appearance region appearing in the operator's face in accordance with the fatigue degree of the operator. The fatigue determination circuit compares a state of the fatigue appearance region within the model image with the fatigue determination criterion. The fatigue degree criteria storage device can store a plurality of fatigue determination criteria. The fatigue determination circuit compares the result of the analysis with a corresponding one of the fatigue determination criteria to notify a corresponding result of determination to the response information output device when the results of the analysis exceeds the determination criterion.

The response information can include music liked by the operator, in which case the output device is a speaker. The response information also can include a state image for notifying the operator of the degree of fatigue, in which case the output device is an image display device.

A method of relieving an operator's fatigue is provided in accordance with another aspect of the present invention. First, the operator's face is captured to create a model image of the face. The model image is analyzed to determine a fatigue degree of the operator. Response information corresponding to the degree of fatigue is output to the operator.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 shows a fatigue degree criteria table;

FIG. 3 shows a response information table;

DETAILED DESCRIPTION OF THE PREFERRED EMBODIMENTS

A first embodiment of the computer system for relieving fatigue according to the present invention will be described below.

Figure 1:
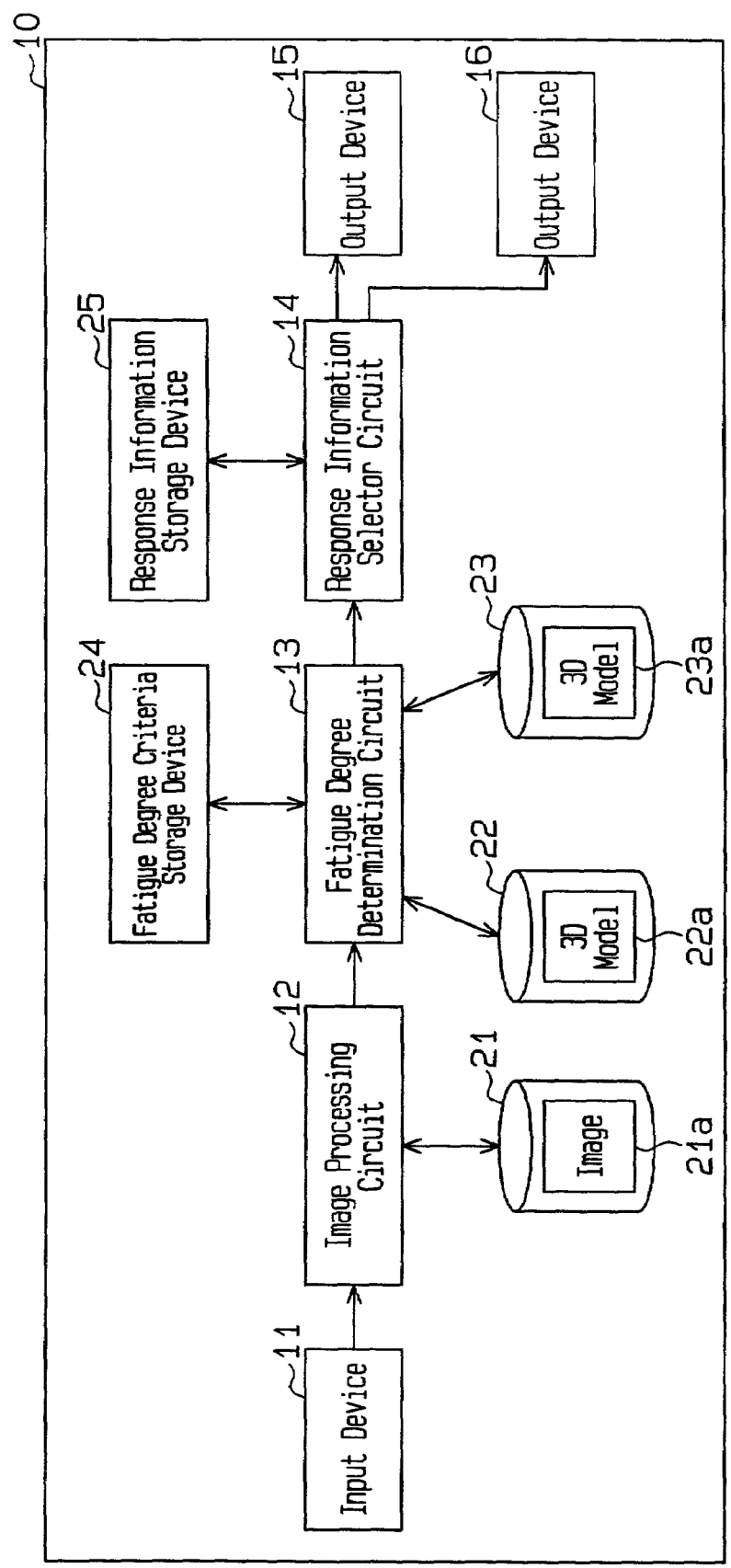
FIG. 1 is a schematic block diagram illustrating a computer system according to one embodiment of the present invention.

As illustrated in FIG. 1, a fatigue relieving computer system 10 includes an input device 11, an image processing circuit 12 connected to the input device 11, a fatigue determination circuit 13 connected to the image processing circuit 12, a response information selector circuit 14 connected to the fatigue determination circuit 13, and output devices 15, 16 connected to the response information selector circuit 14. The computer system 10 further includes a response information storage device 25 connected to the response information selector circuit 14, an image storage device 21 connected to the image processing circuit 12, and model image storage devices 22, 23 and a fatigue degree criteria storage device 24 connected to the fatigue determination circuit 13. The computer system 10 creates a three-dimensional (3D) model image of the face of an operator every predetermined time to determine the fatigue degree of the operator based on the 3D model image. Then, the computer system 10 generates response information for relieving the operator's fatigue in accordance with the fatigue degree of the operator. The computer system 10 may display a state image, or condition image, representing the fatigue degree of the operator in accordance with the results of an analysis on the 3D model image. The displayed state image will help the operator recognize his or her current physical condition.

The input device 11 captures the face of the operator, and supplies image data representing the face to the image processing circuit 12 every predetermined time. The input device 11 is preferably an image input device such as a digital camera.

The image processing circuit 12 stores face image data 21a supplied by the input device 11 in the first storage device 21, and creates 3D model images 22a, 23a from the face image data 21a. Then, the image processing circuit 12 supplies the 3D model images 22a, 23a to the fatigue determination circuit 13. The image processing circuit 12 is preferably an image modeler. For creating a 3D model image, the image processing circuit 12 first analyzes the operator's face from the image data 21a. For example, the image processing circuit 12 compares the face image data 21a with a reference value of a skin color to identify various parts of the face such as eyes, nose and mouth, and determine the sizes and conditions of the respective parts. When the eyes are identified, the image processing circuit 12 examines the eyeballs and skin around the eyes (dark rings around the eyes). For examining afflux of the eyes, the image processing circuit 12 determines the color of the white part of the eyes based on the coordinates of the eyes and eyeballs.

The fatigue determination circuit 13 analyzes changes in the 3D model images 22a, 23a over time to examine portions of the operator's face associated with the fatigue (fatigue appearance regions. For example, the dark rings around the eyes and afflux). More specifically, the fatigue determination circuit 13 stores two 3D model images 22a, 23a, which are captured at different times, in the second and third storage devices 22, 23, respectively. Next, the fatigue determination circuit 13 compares the two 3D model images 22a, 23a (for example, the 3D model image 22a stored at the preceding time and the 3D image 23a stored at the current time). As the operator becomes tired over time, the difference between the two 3D model images 22a, 23a represents a change caused by fatigue. Therefore, the difference can be seen in the fatigue appearance regions.

Next, the fatigue determination circuit 13 references and stores the fatigue degree criteria table 240 of FIG. 2 in the fatigue degree criteria storage device 24 to determine the fatigue degree of the operator from the positions and conditions of the fatigue appearance regions. Then, the fatigue determination circuit 13 supplies the results of the determination to the response information selector circuit 14.

As shown in FIG. 2, the fatigue degree criteria table 240 includes a plurality of reference data for determining the degree of fatigue. The fatigue degree criteria table 240 has a position field 24a, a three-dimensional size reference field 224b, a color reference field 24c, and a fatigue degree field 24d.

The position field 24a stores data on a reference position (fatigue appearance region) for determining the degree of fatigue. The three-dimensional size reference field 24b stores reference data on the size of the fatigue appearance region, such as the size of a dark ring around the eye. Alternatively, the three-dimensional size reference field 24b may store the amount of a change in the size of the fatigue appearance region instead of the size of the fatigue appearance region. The color reference field 24c stores reference data on the condition (color) of the fatigue appearance region. The fatigue degree field 24d stores the degree of fatigue which was previously set based on the size (or the amount of a change in) and condition of the fatigue appearance region.

The fatigue determination circuit 13 selects reference data in the fatigue degree criteria table 240 which conforms to a position and a condition of the observed fatigue appearance region, and supplies the response information selector circuit 14 with a corresponding degree of fatigue. The response information selector circuit 14 selects response information stored in the response information storage device 25 in accordance with the degree of fatigue, and supplies the selected response information to the first and second output devices 15, 16. The response information includes fatigue notification information and relaxing information.

The response information storage device 25 stores a response information table 250 shown in FIG. 3. The response information table 250 has a fatigue degree field 25a, an output device field 25b, and a content field 25c, and includes a plurality of correspondence records. Each of the correspondence records has data on the degree of fatigue, response information and a device to which the response information is output. The response information storage device 25 may store a plurality of response information tables 250 which may be set in accordance with individual operators.

The fatigue degree field 25a indicates the degree of fatigue. The output device field 25b indicates the output device 15 or 16 to which response information is output. For example, the first output device 15 is a display device such as CRT (cathode-ray tube), and the second output device 16 is a speaker. The content field 25c indicates the contents (file name) of output response information. The contents of response information include a message that prompts the operator to have a break, and music liked by the operator.

If the fatigue determination circuit 13 determines that the fatigue degree of the operator is, for example, "1", the response information selector circuit 14 selects a correspondence record corresponding to the degree of fatigue "1". Then, the response information selector circuit 14 displays a message for prompting the operator to have a break on the display device 15, notifying the operator that it is about time for the operator to have a break.

A fatigue relief processing performed by the computer system 10 is described in FIGS. 4 through 7.

Figure 4:
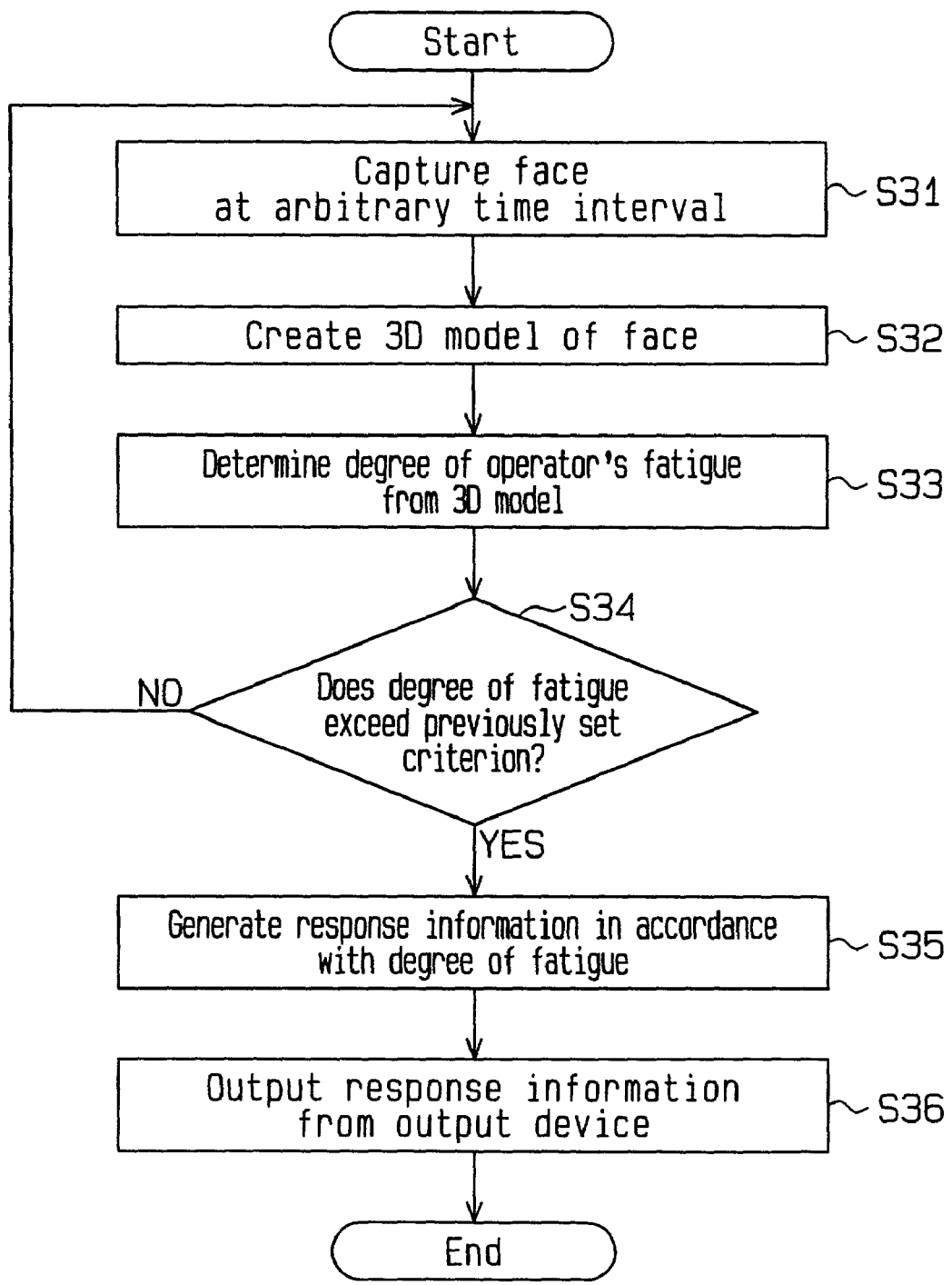
FIG. 4 is a flow chart illustrating fatigue relief process according to the present invention.

As shown in FIG. 4, in step S31, the input device 11 captures the operator's face at arbitrary time intervals (for example, every ten minutes), and supplies data on the captured image to the image processing circuit 12. The image data may represent a still image or a moving image.

In step S32, the image processing circuit 12 utilizes the image modeler technology to create a 3D model image of the operator's face. In step S33, the fatigue determination circuit 13 analyzes a fatigue appearance region such as dark rings around the eyes based on 3D model images 22a, 23a to examine the fatigue degree of the operator. In step S34, the fatigue determination circuit 13 checks whether or not the degree of fatigue exceeds a previously set threshold value. When the degree of fatigue does not exceed the threshold value, the processing returns to step S31. On the other hand, when the degree of fatigue exceeds the threshold value, the processing proceeds to step S35. In step S35, the response information selector circuit 14 selects response information in accordance with the degree of fatigue. In step S36, the selected response information is output from the first output device 15 or the second output device 16.

Figure 5:
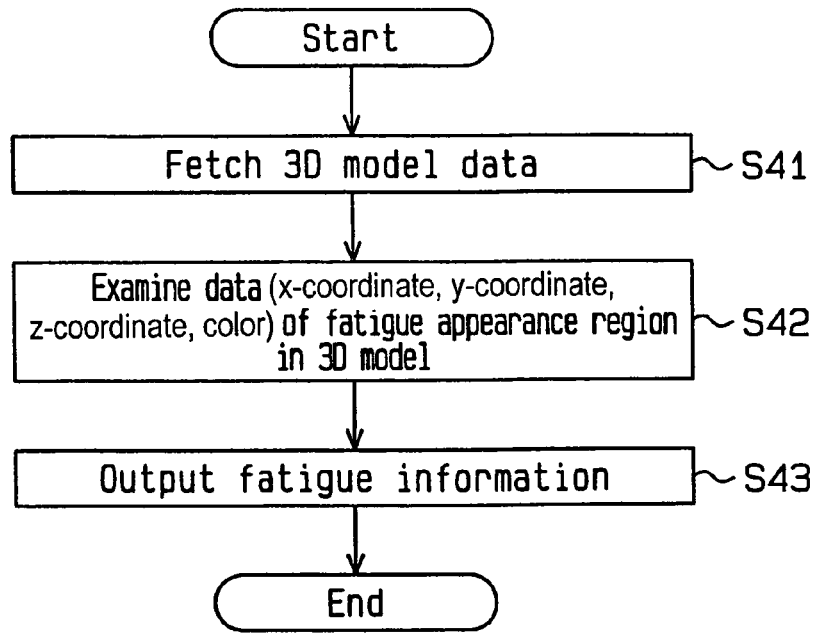
FIG. 5 is a flow chart illustrating image processing according to the present invention.

An image processing describing the fatigue determination circuit 13 extracting a fatigue appearance region using the 3D model image of the operator's face is shown in FIG. 5.

First in step S41, the fatigue determination circuit 13 acquires the 3D model image data from the image processing circuit 12. Then, in step S42, the fatigue determination circuit 13 examines the x-coordinate, y-coordinate, z-coordinate and color of the fatigue appearance region, such as dark rings around the eyes, from the 3D model image data. The fatigue determination circuit 13 examines the size of the fatigue appearance region from the respective coordinate values, and examines a change in the skin color from the color information on the fatigue appearance region. In step S43, the fatigue determination circuit 13 outputs fatigue appearance information including the size and color of the fatigue appearance region to registers that is not shown.

Figure 6:
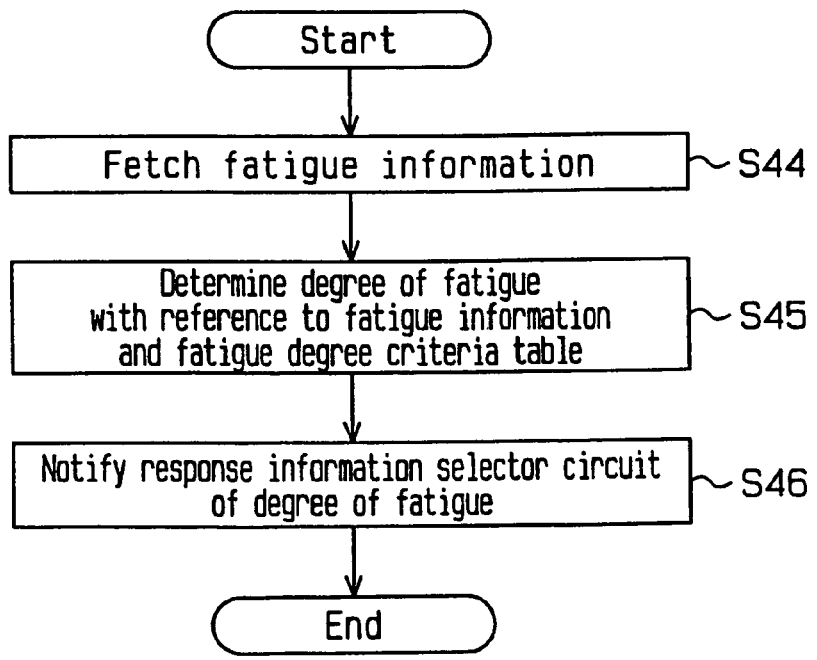
FIG. 6 is a flow chart illustrating fatigue determination process according to the present invention.

Additionally, a fatigue determination process describing the fatigue determination circuit 13 determining the fatigue degree of the operator is shown in FIG. 6. First, in step S44, the fatigue determination circuit 13 acquires the fatigue appearance information derived in steps S41 through S43 in FIG. 5. In step S45, the fatigue determination circuit 13 references the fatigue degree criteria table 240 to determine the degree of fatigue. In step S46, the fatigue determination circuit 13 notifies the response information selector circuit 14 of the results of the determination (the degree of fatigue).

Figure 7:
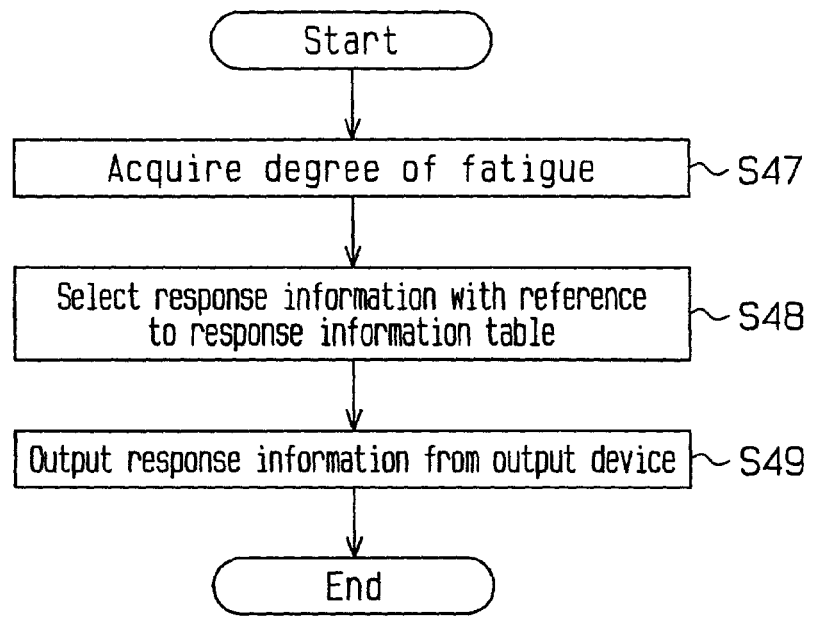
FIG. 7 is a flow chart illustrating response information generation process according to the present invention.

A response information generation process describing the response information selector circuit 14 selecting response information is shown in FIG. 7. First, in step S47, the response information selector circuit 14 acquires the results of the determination made by the fatigue determination circuit 13. In step S48, the response information selector circuit 14 references the response information of table 250 to select appropriate response information in accordance with the result of the determination. In step S49, the response information selector circuit 14 supplies the selected response information to the output devices 15, 16.

Figure 8:
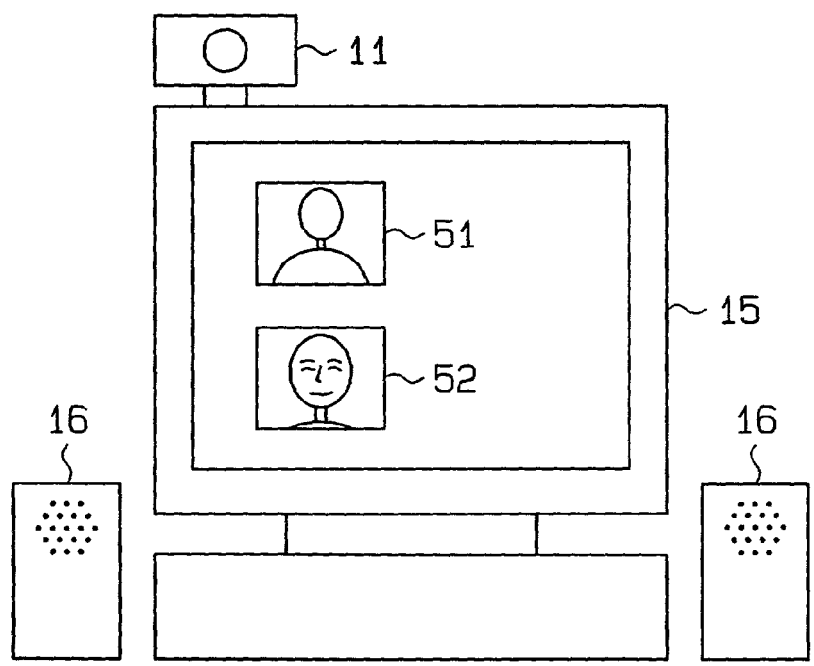
FIG. 8 is a schematic diagram of a computer system when the operator is not tired.
Figure 9:
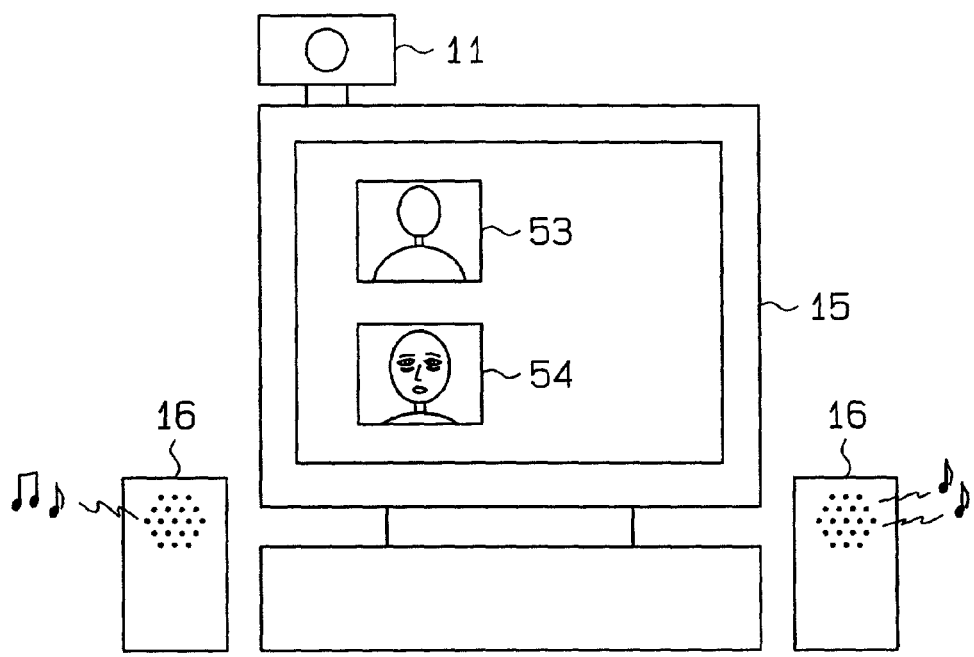
FIG. 9 is a schematic diagram of a computer system when the operator is tired.

The operation of the computer system 10 is also described in FIGS. 8 and 9.

As shown in FIG. 8, in response to an operator operating the computer system 10, the computer system 10 fetches the image of the operator's face on a 3D model image 51. The fatigue degree of the operator is examined based on the 3D model image 51. Also, the computer system 10 displays the 3D model image 51 and a state image 52 on the first output device 15. In this event, since the operator is not tired, the state image 52 represents a lively expression.

FIG. 9 illustrates the computer system 10 when the fatigue degree of the operator reaches "1". The computer system 10 displays a 3D model image 53 and a state image 54 at this time on the first output device 15. Since the operator is tired, the state image 54 represents a tired expression. In addition, the computer system 10 outputs music liked by the operator from the second output device 16 corresponding to the degree of fatigue "1". The favorite music (relaxing information) will relieve the operator of the fatigue.

Figure 10:
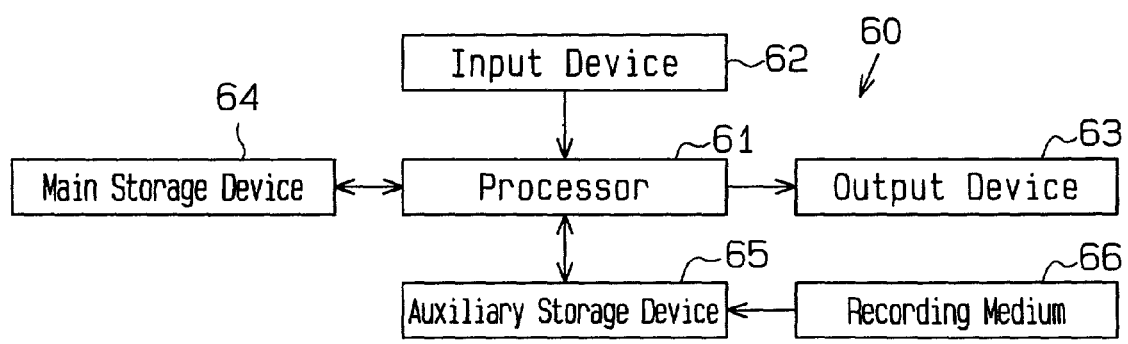
FIG. 10 is a schematic block diagram illustrating the computer system of FIG. 1.

Alternatively, a computer system 60 used for general purposes, such as a personal computer and a workstation, which may execute a computer program describing the aforementioned method of relieving the operator's fatigue is shown in FIG. 10.

As illustrated in FIG. 10, the computer system 60 includes a processor 61, an input device 62 such as a keyboard, an output device 63 such as a CRT or a liquid crystal display, a main storage device 64, and an auxiliary storage device 65.

The processor 62 executes one or more programs which describe the processing routines illustrated in FIGS. 4 through 7. The computer programs may be provided as stored in a portable recording medium 66 such as a floppy disk and CD-ROM, in a main storage device or an auxiliary storage device of another computer connected thereto through a network, or the like.

The computer program is copied or installed from the portable medium 66 into the auxiliary storage device 65, and subsequently loaded into the main storage device 64. Alternatively, the computer program is directly loaded from the portable medium 66 into the main storage device 64, and executed by the processor 61. The auxiliary storage device 65 stores the image data 21a, 3D model image data 22a, 23a, fatigue degree criteria table 240, and response information table 250 in FIG. 1.

When a computer program is stored in another device connected through a network, the computer program is also received from the other device through the network. Subsequently, the computer program is copied or installed into the auxiliary storage device 65 and then loaded into the main storage device 64, or is directly loaded into the main storage device 64.

According to the foregoing embodiment, the following advantages are provided.

(1) The computer system 10 analyzes a 3D model image of the operator's face to determine the fatigue degree of the operator. Then, the computer system 10 provides the operator with response information (relaxing information) preferred by the operator through the output devices 15, 16, corresponding to the degree of fatigue. As a result, the operator is relieved of his or her fatigue. Also, since the computer system 10 notifies the operator of response information indicating the degree of fatigue (fatigue notification information), the operator exactly recognizes his or her own fatigue.

(2) Since the fatigue determination circuit 13 determines the degree of fatigue with reference to the determination criteria for the degree of fatigue stored in the fatigue degree criteria storage device 24, the fatigue degree of the operator is exactly determined.

(3) The response information selector circuit 14 references the stored response information table 250 in accordance with the operator, and outputs response information corresponding to the degree of fatigue from the output devices 15, 16. Thus, relaxing information preferred by the operator is output in accordance with the operator's fatigue, so that the operator is relieved of the fatigue.

The foregoing embodiment may be modified as follows.

The fatigue determination circuit 13 may determine the fatigue degree of the operator based on the afflux of the eyes. In this case, the response information selector circuit 14 may generate response information for changing the hue, luminance and contrast on the screen of the first output device (display device) 15 in accordance with the degree of the operator's fatigue.

The fatigue determination circuit 13 may use a moving image captured by the input device 11 to extract a characteristic fatigue action of the operator, and determine the fatigue degree of the operator based on the fatigue action.

Figure 11:
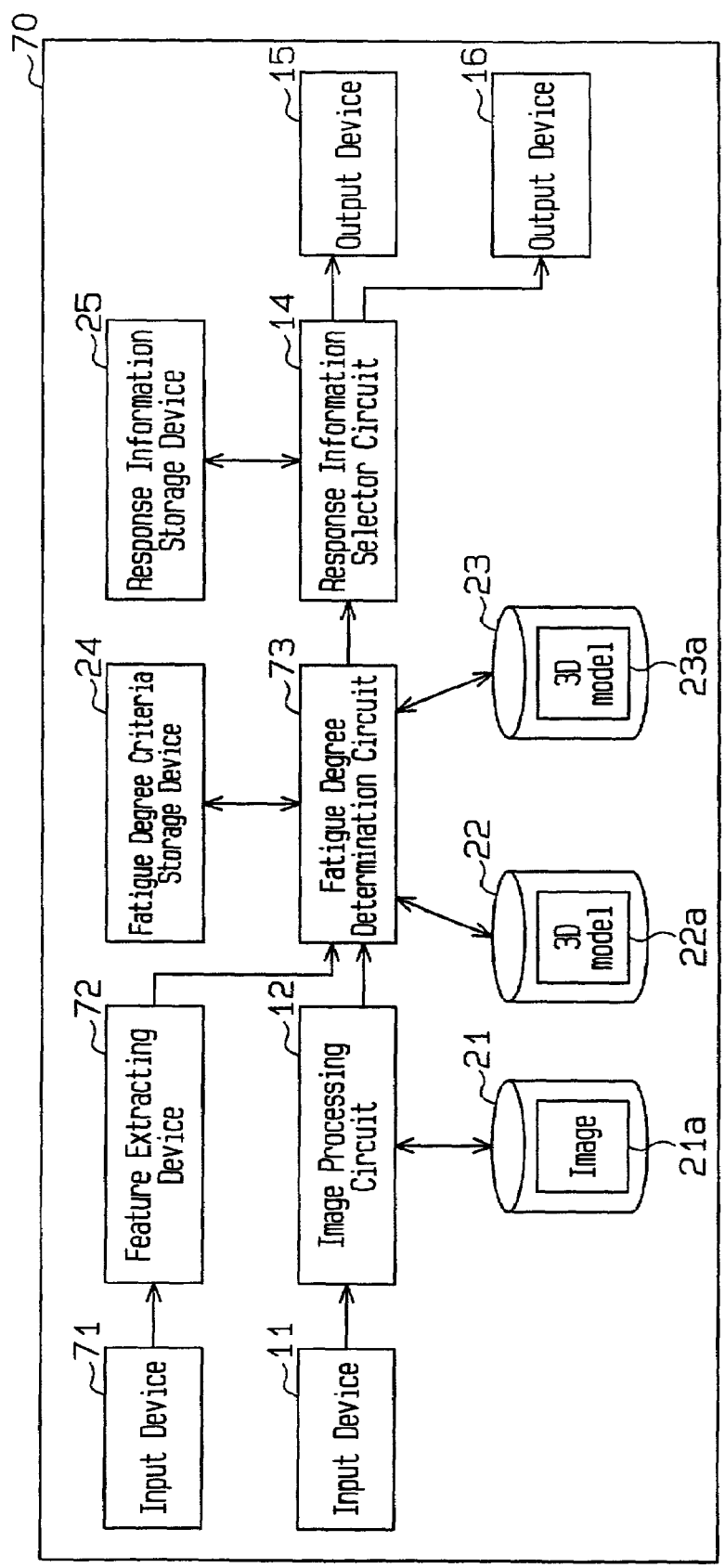
FIG. 11 is a block diagram illustrating a computer system according to another embodiment of the present invention.

The degree of fatigue may be determined based on other information such as the operator's body temperature, blood pressure, pulse rate or the like in addition to the image of the operator's face. Using such information, the degree of the operator's fatigue is determined in detail to output more exact response information. In this case, a computer system 70 illustrated in FIG. 11 is preferably used.

The computer system 70 includes all the devices of the computer system 10 and additionally includes an input device 71 and a feature extracting circuit 72. The input device 70 detects the operator's body temperature, blood pressure, heart rate and so on to generate detection information indicative of these parameters. The feature extracting circuit 72 extracts fatigue information corresponding to the degree of fatigue from the detection information of the input device 71. A fatigue determination circuit 73 totally determines the fatigue degree of the operator based on a 3D model image acquired from the image processing apparatus 12 and the fatigue information acquired from the feature extracting circuit 72.

As the input device 71, a key input sensor equipped in a keyboard may be used. In this case, the feature extracting circuit 72 extracts the fatigue information on the operator based on variations in key stroke, erroneous inputs, and so on.

If the degree of fatigue can be determined from the color and size of a fatigue appearance region, such as afflux of the eyes and the size of dark rings around the eyes, a 2D model image may be utilized instead of a 3D model image.

The computer includes a personal computer, an office computer, and a word processor, each of which is operated by the operator through manipulations on an input device such as a keyboard and a mouse while viewing a display screen.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A computer system for relieving a computer operator's fatigue, comprising:

an input device capturing the computer operator's face to generate image data representing the face;

an image processing circuit connected to the input device creating a model image of the computer operator's face from the image data;

a fatigue determination circuit connected to the image processing circuit analyzing the model image to determine one of a plurality of fatigue degrees of the computer operator;

an information generator circuit connected to the fatigue determination circuit generating response information including a state image of the computer operator in accordance with a result of the determination; and an output device connected to the information generator circuit outputting the response information including the state image and the model image to the computer operator regardless of fatigue degree of the computer operator.

2. The computer system according to claim 1, wherein the image processing circuit creates the model image every predetermined time, and the fatigue determination circuit compares a currently created model image with a previously created model image to determine the degree of fatigue based on a difference between the two model images.

3. The computer system according to claim 1, further comprising a response information storage device, connected to the information generator circuit, storing a response information table representing a correspondence among the plurality of degrees of fatigue, the response information, and the output device to which the response information is output, wherein the information generator circuit supplies the response information to the output device with reference to the response information table.

4. The computer system according to claim 3, wherein the response information storage device further stores a plurality of response information tables corresponding with a plurality of operators.

5. The computer system according to claim 1, further comprising:

a fatigue degree criteria storage device connected to the fatigue determination circuit storing a fatigue determination criterion set in accordance with the fatigue degree of the operator, wherein the fatigue determination circuit determines the degree of fatigue with reference to the result of an analysis on the model image and the fatigue determination criterion.

6. The computer system according to claim 5, wherein the fatigue determination criterion includes information on a fatigue appearance region in the operator's face with respect to the fatigue degree of the operator, wherein the fatigue determination circuit compares a state of the fatigue appearance region within the model image with the fatigue determination criterion.

7. The computer system according to claim 5, wherein the fatigue determination criterion is one of a plurality of fatigue determination criteria previously set corresponding to the operator, wherein the fatigue determination circuit compares the result of the analysis with a corresponding one of the fatigue determination criteria to notify a corresponding result of determination to the response information output device when the results of the analysis exceeds the determination criterion.

8. The computer system according to claim 5, wherein the fatigue determination criterion includes information on a size of the fatigue appearance region, and information on a state in the fatigue appearance region.

9. The computer system according to claim 1, wherein when the operator is not tired, the output device outputs a response information representing that the operator is not tired.

10. The computer system according to claim 1, wherein the response information includes relaxing information including a favorite music of the computer operator.

11. A computer system for relieving a computer operator's fatigue, comprising:
   an image capture device capturing the computer operator's face;
   an image processing circuit connected to the image capture device creating a model image of the computer operator's face;
   a fatigue degree criteria storage device storing fatigue determination criteria set in accordance with each of a plurality of fatigue degrees of the computer operator;
   a fatigue determination circuit connected to the fatigue degree criteria storage device and the image processing circuit, respectively, analyzing the model image to determine the fatigue degree of the computer operator with reference to the results of the analysis and the fatigue determination criteria;
   an information generator circuit connected to the fatigue determination circuit generating response information including a state image corresponding to a result of determination; and
   an output device connected to the information generator circuit outputting the response information and a model image to the computer operator regardless of fatigue degree of the computer operator.

12. The computer system according to claim 11, wherein the response information includes music selected by the computer operator, and the output device comprises a speaker.

13. The computer system according to claim 11, wherein the response information includes a state image for notifying the operator of the degree of fatigue, and the output device includes an image display device.

14. The computer system according to claim 11, wherein when the operator is not tired, the output device outputs a response information representing that the operator is not tired.

15. A method of relieving a computer operator's fatigue, comprising:
   capturing the computer operator's face to create a model image of the face;
   analyzing the model image to determine one of a plurality of fatigue degrees of the operator; and
   outputting response information including a state image corresponding to the degree of fatigue and the model image to the computer operator regardless of fatigue degree of the computer operator.

16. The method according to claim 15, wherein the outputting response information includes outputting a response information representing that the operator is not tired when the operator is not tired.

17. A computer readable recording medium having recorded thereon a program for relieving a computer operator's fatigue, the program comprising:
   capturing the computer operator's face to create a model image of the computer operator's face;
   analyzing the model image to determine one of a plurality of fatigue degrees of the computer operator; and
   outputting response information including a state image corresponding to the degree of fatigue and the model image to the computer operator regardless of fatigue degree of the computer operator.

18. The medium according to claim 17, wherein the outputting response information includes outputting a response information representing that the operator is not tired when the operator is not tired.

19. A computer system for relieving a computer operator's fatigue, comprising:
   an input device which captures the computer operator's face and generates image data representing the face;
   an image processing circuit connected to the input device and which creates a model image of the computer operator's face from the image data;
   a fatigue determination circuit connected to the image processing circuit and which analyzes the model image and determines one of a plurality of fatigue degrees of the computer operator;
   an information generator circuit connected to the fatigue determination circuit and which generates response information including a state image of the computer operator in accordance with a result of the determination;
   a response information storage device connected to the information generator circuit and which stores a plurality of response information tables corresponding with a plurality of computer operators; and
   an output device connected to the information generator circuit and the response information storage and which outputs the response information and the model image regard less of fatigue degree of the computer operator.

20. A computer system for relieving a computer operator's fatigue, comprising:
   an input device which captures the computer operator's face and generates image data representing the face;
   an image processing circuit connected to the input device and which creates a model image of the computer operator's face from the image data;
   a fatigue determination circuit connected to the image processing circuit and which analyzes the model image and determines one of a plurality of fatigue degrees of the computer operator;
   an information generator circuit connected to the fatigue determination circuit and which generates response information including a state image of the computer operator in accordance with a result of the determination of the fatigue degree;
   a response information storage device connected to the information generator circuit for storing a response information table corresponding with the computer operator, wherein the response information table has contents of the response information corresponding to the fatigue degree of the computer; and
   an output device connected to the information generator circuit and the response information storage and which outputs the response information and the model image regardless of fatigue degree of the computer operator.

21. A computer system for relieving a computer operator's fatigue, comprising:
   an input device which captures the computer operator's face and generates image data representing the computer operator's face;
   an image processing circuit connected to the input device and which creates a model image of the computer operator's face from the image data;

a fatigue determination circuit connected to the image processing circuit and which analyzes the model image and determines one of a plurality of fatigue degrees of the computer operator;

an information generator circuit connected to the fatigue determination circuit and which generates response information including a state image of the computer operator in accordance with a result of the determination of the fatigue degree; and an output device connected to the information generator circuit and which outputs the response information and the model image regardless of fatigue degree of the computer operator, wherein the fatigue determination circuit determines the fatigue degree in comparison to an initial operator model corresponding to a known degree of fatigue.

22. A computer system for relieving a computer operator's fatigue, comprising:

an input device which captures the computer operator's face and generates image data representing the computer operator's face;

an image processing circuit connected to the input device and which creates a model image of the computer operator's face from the image data;

a fatigue determination circuit connected to the image processing circuit and which analyzes the model image and determines one of a plurality of fatigue degrees of the computer operator;

an information generator circuit connected to the fatigue determination circuit and which generates response information including a state image of the computer operator in accordance with a result of the determination of the fatigue degree; and an output device operatively connected to the information generator circuit, which output device continuously outputs the response information including the state image and the model image to the operator indicating a current fatigue level of the operator regardless of fatigue degree of the computer operator.

23. A method for relieving a computer operator's fatigue, comprising:

capturing the operator's face and generating image data representing the face;

creating a model image of the operator's face from the image data;

analyzing the model image regarding the physical condition of the operator and determining a fatigue degree of the computer operator;

generating response information including a state image in accordance with a result of the determination of the fatigue degree; and continuously outputting the response information to the operator indicating a current fatigue level of the operator and the model image regardless of the fatigue degree of the computer operator.

24. The method according to claim 23, wherein the captured physical condition is the computer operators body temperature, blood pressure, or pulse rate.

25. A method of relieving a computer operator's fatigue, comprising:

capturing image information regarding a physical condition of the computer operator;

analyzing the image information regarding the physical condition to determine one of a plurality of fatigue degrees of the computer operator; and outputting response information including a model image corresponding to the degree of fatigue of the computer operator regardless of fatigue degree of the computer operator.

26. The method according to claim 25, wherein the captured physical condition is an eye condition of the computer operator and the response information includes adjustment information of a display viewed by the computer operator.

27. The method according to claim 25, wherein the captured physical condition is the computer operators body temperature, blood pressure, or pulse rate.

28. The method according to claim 25, wherein the capturing of physical information is based on variations of keyboard entries by the computer operator.

* * * * *

UNITED STATES PATENT AND TRADEMARK OFFICE
CERTIFICATE OF CORRECTION

PATENT NO. : 7,224,834 B2
APPLICATION NO. : 09/789523
DATED : May 29, 2007
INVENTOR(S) : Masaya Nambu It is certified that error appears in the above-identified patent and that said Letters Patent is hereby corrected as shown below:

Column 10, Line 30 (Claim 19, Line 24), change "regard less" to --regardless--.

Column 10, Line 52 (Claim 20, Line 22), change "computer;" to --computer operator;--.

Column 12, Line 25 (Claim 25, Line 8), change "information including a model image" to --information, including a model image,--.

Signed and Sealed this

First Day of April, 2008

JON W. DUDAS
*Director of the United States Patent and Trademark Office*